United States Patent
Mantooth

(10) Patent No.: US 9,623,840 B1
(45) Date of Patent: Apr. 18, 2017

(54) ANTI-THEFT AND CHILD SAFETY DEVICE FOR AN AUTOMOBILE

(71) Applicant: Kurtis Mantooth, Decherd, TN (US)

(72) Inventor: Kurtis Mantooth, Decherd, TN (US)

( * ) Notice: Subject to any disclaimer, the term of this patent is extended or adjusted under 35 U.S.C. 154(b) by 0 days.

(21) Appl. No.: 15/050,942

(22) Filed: Feb. 23, 2016

(51) Int. Cl.
*B60R 25/10* (2013.01)
*B60R 25/31* (2013.01)
*B60Q 9/00* (2006.01)
*B60R 1/04* (2006.01)
*G08B 13/19* (2006.01)

(52) U.S. Cl.
CPC .............. *B60R 25/31* (2013.01); *B60Q 9/00* (2013.01); *B60R 1/04* (2013.01); *G08B 13/19* (2013.01)

(58) Field of Classification Search
CPC ...... B60N 2/002; B60N 2/26; B60H 1/00742; B60H 1/00792; B60H 1/00978; B60R 1/04; B60R 2001/1223; B60R 21/00; B60R 25/04; B60R 25/1004; B60R 25/102; B60R 25/2009; B60R 25/305; B60R 25/33; B65D 25/04; B65D 47/243; G08B 21/02; G08B 21/0202; G08B 21/0208; G08B 21/22; G08B 21/24
See application file for complete search history.

(56) References Cited

U.S. PATENT DOCUMENTS

| | | |
|---|---|---|
| 6,323,762 B1 | 11/2001 | Ekpo, Jr. |
| 6,423,894 B1 | 7/2002 | Patz et al. |
| 6,639,512 B1 | 10/2003 | Lee et al. |
| 6,812,854 B1 * | 11/2004 | Edwin ................. B60R 1/12 340/901 |
| 6,922,147 B1 | 7/2005 | Viksnins et al. |
| 7,081,811 B2 | 7/2006 | Johnston et al. |
| 7,084,774 B2 | 8/2006 | Martinez |
| 7,348,880 B2 | 3/2008 | Hules et al. |
| 9,327,685 B1 * | 5/2016 | Wooten ............ B60R 25/102 |
| 2002/0003571 A1 * | 1/2002 | Schofield ............ B60C 23/00 348/148 |
| 2004/0165397 A1 | 8/2004 | Bentivoglio et al. |
| 2006/0103516 A1 | 5/2006 | Zang |
| 2008/0004774 A1 | 1/2008 | Wieczorek et al. |

FOREIGN PATENT DOCUMENTS

ES   1068717 U   11/2008

* cited by examiner

*Primary Examiner* — Kerri McNally
*Assistant Examiner* — Renee Dorsey
(74) *Attorney, Agent, or Firm* — Stevenson IP, LLC

(57) ABSTRACT

An anti-theft and child safety device for an automobile including a rearview mirror mounted to an interior of an automobile. The rearview mirror has a mounting support, a mirror support, a reflective mirror mounted within the mirror support, and a front casing continuously disposed around an outer edge of the reflective mirror. At least one infrared sensor is disposed on the rearview mirror, and a solar panel is disposed on a roof of the automobile. A central processing unit, a rechargeable battery, and a wireless transmitter are disposed within the mirror support of the rearview mirror. The central processing unit is configured to activate the at least one infrared sensor when an engine of the automobile is turned off and remains off for five consecutive minutes, and the at least one infrared sensor is configured to activate an alarm of the automobile when heat is detected in the automobile.

2 Claims, 3 Drawing Sheets

ANTI-THEFT AND CHILD SAFETY DEVICE FOR AN AUTOMOBILE

BACKGROUND OF THE INVENTION

Various types of child safety devices and anti-theft devices are known in the prior art. However, what has been needed is an anti-theft and child safety device for an automobile including a rearview mirror mounted to an interior of an automobile, the rearview mirror having a mounting support, a mirror support, a reflective mirror mounted within the mirror support, and a front casing continuously disposed around an outer edge of the reflective mirror. What has been further needed is at least one infrared sensor disposed on the rearview mirror and a solar panel disposed on a roof of the automobile. Lastly, what has been needed is a central processing unit, a rechargeable battery, and a wireless transmitter disposed within the mirror support of the rearview mirror. The central processing unit is configured to activate the at least one infrared sensor when an engine of the automobile is turned off and remains off for five consecutive minutes, and the at least one infrared sensor is configured to activate an alarm of the automobile when heat is detected in the automobile. The central processing unit is configured to then activate the wireless transmitter to transmit an emergency response signal to an emergency response system, such as 911, when the automobile alarm is activated. The anti-theft and child safety device for an automobile is thus structured to simultaneously provide a warning and transmit an emergency response signal when a child or pet has been left behind in an automobile. The device is unique to other child safety and anti-theft devices in that it incorporates the integral structural elements necessary for the device directly into the rearview mirror of the automobile, while harnessing the energy of the sun to power the device.

FIELD OF THE INVENTION

The present invention relates to child safety devices and anti-theft devices, and more particularly, to an anti-theft and child safety device for an automobile.

SUMMARY OF THE INVENTION

The general purpose of the present anti-theft and child safety device for an automobile, described subsequently in greater detail, is to provide an anti-theft and child safety device for an automobile which has many novel features that result in an anti-theft and child safety device for an automobile which is not anticipated, rendered obvious, suggested, or even implied by prior art, either alone or in combination thereof.

To accomplish this, the present anti-theft and child safety device for an automobile includes a rearview mirror mounted to an interior of an automobile. The rearview mirror has a mounting support, a mirror support, a reflective mirror mounted within the mirror support, and a front casing continuously disposed around an outer edge of the reflective mirror. At least one infrared sensor, optionally two, is disposed on the rearview mirror front casing. A solar panel is disposed on a roof of the automobile. A central processing unit is disposed within the mirror support of the rearview mirror behind the reflective mirror, a rechargeable battery is disposed within the mirror support of the rearview mirror behind the central processing unit, and a wireless transmitter is disposed within the mirror support of the rearview mirror. The solar panel is in operational communication with the rechargeable battery. The solar panel is configured to selectively charge the rechargeable battery.

The central processing unit is configured to activate the at least one infrared sensor when an engine of the automobile is turned off and remains off for five consecutive minutes. The at least one infrared sensor is configured to activate an alarm of the automobile when heat is detected in the automobile. The central processing unit is configured to activate the wireless transmitter to transmit an emergency signal to an emergency response system, including a 911 system, when the automobile alarm is activated. The at least one infrared sensor, the automobile alarm, the central processing unit, the wireless transmitter, the rechargeable battery, and the automobile engine are in operational communication with each other. The central processing unit can also be programmed to activate the automobile alarm if an owner of the automobile fails to turn on the engine within three minutes of his return to the automobile.

Thus has been broadly outlined the more important features of the present anti-theft and child safety device for an automobile so that the detailed description thereof that follows may be better understood and in order that the present contribution to the art may be better appreciated.

BRIEF DESCRIPTION OF THE DRAWINGS

FIGURES

Figure 1:
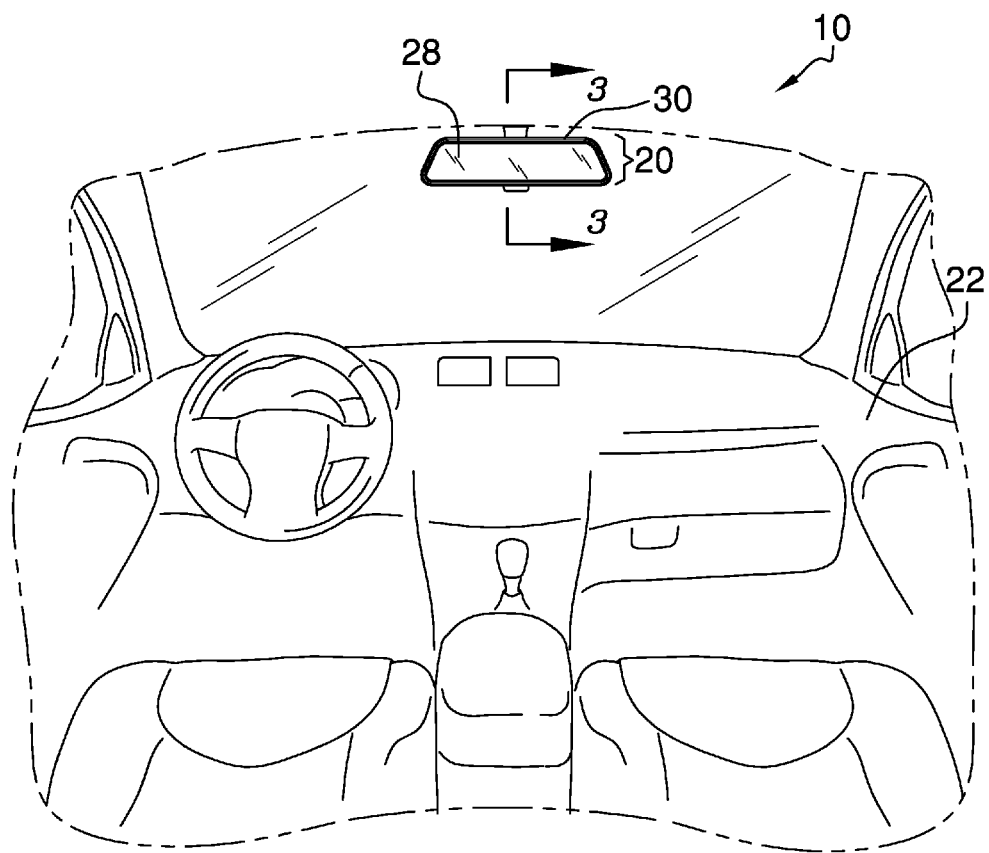
Figure 2:
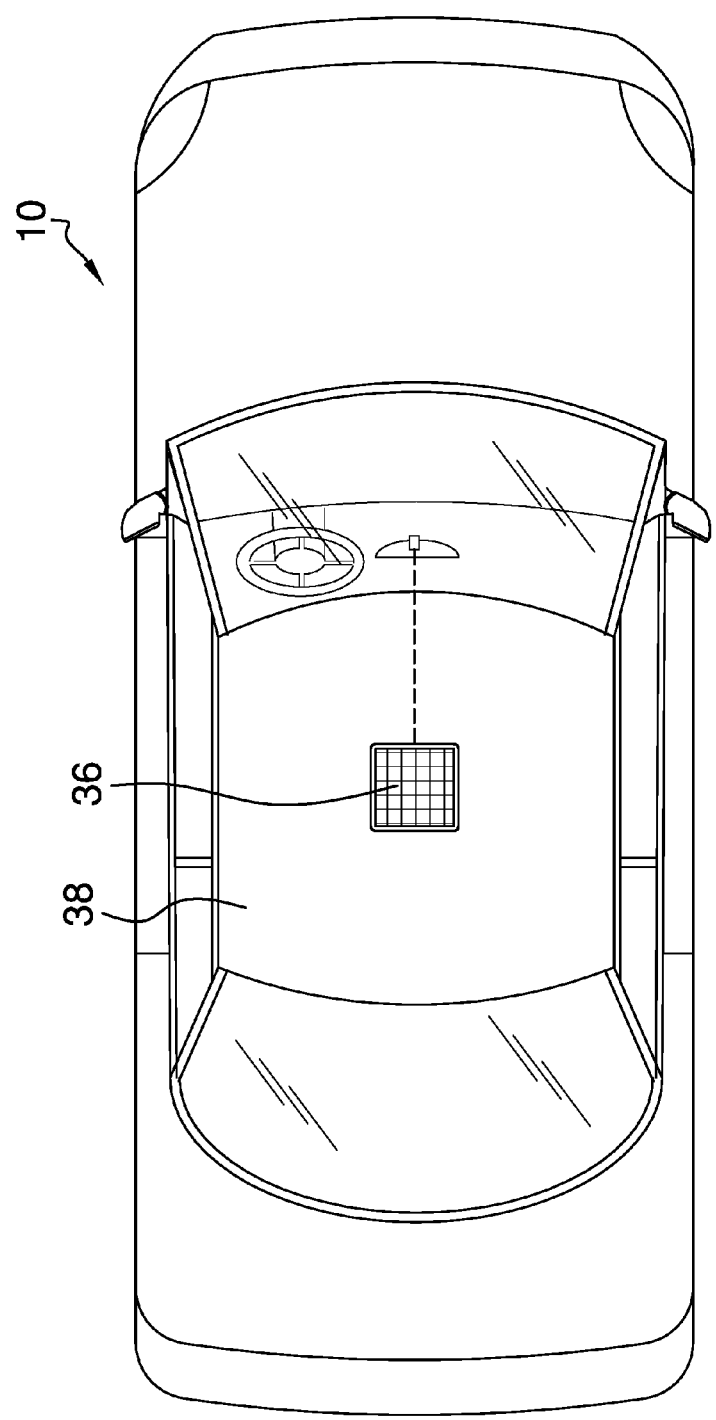
Figure 3:
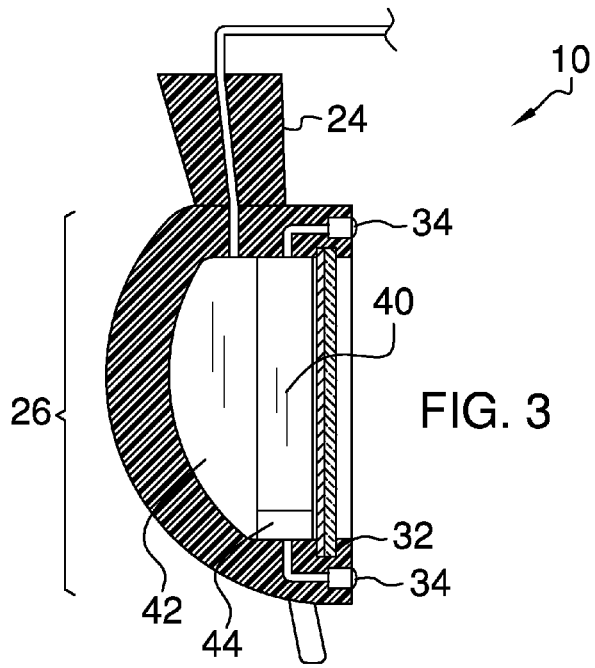
Figure 4:
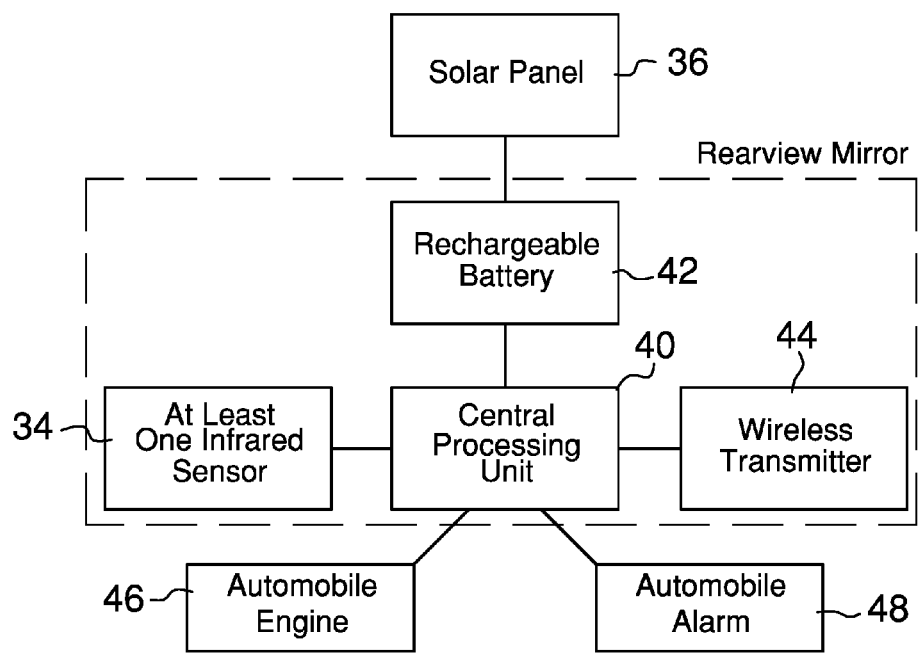

FIG. 1 is an in use view.
FIG. 2 is a top plan view.
FIG. 3 is a cross-sectional view taken along line 3-3 of FIG. 1.
FIG. 4 is a block diagram.

DETAILED DESCRIPTION OF THE DRAWINGS

With reference now to the drawings, and in particular FIGS. 1 through 4 thereof, an example of the instant anti-theft and child safety device for an automobile employing the principles and concepts of the present anti-theft and child safety device for an automobile and generally designated by the reference number 10 will be described.

Referring to FIGS. 1 through 4 the present anti-theft and child safety device for an automobile 10 is illustrated. The anti-theft and child safety device for an automobile 10 includes a rearview mirror 20 mounted to an interior of an automobile 22. The rearview mirror 20 has a mounting support 24, a mirror support 26, a reflective mirror 28 mounted within the mirror support 26, and a front casing 30 continuously disposed around an outer edge 32 of the reflective mirror 28. At least one infrared sensor 34 is disposed on the rearview mirror front casing 30. The at least one infrared sensor 34 is optionally two. A solar panel 36 is disposed on a roof 38 of the automobile 22. A central processing unit 40 is disposed within the mirror support 26 of the rearview mirror 20 behind the reflective mirror 28, a rechargeable battery 42 is disposed within the mirror support 26 of the rearview mirror 20 behind the central processing unit 40, and a wireless transmitter 44 is disposed within the mirror support 26 of the rearview mirror 20. The solar panel 36 is in operational communication with the rechargeable battery 42. The solar panel 36 is configured to selectively charge the rechargeable battery 42.

The central processing unit 40 is configured to activate the at least one infrared sensor 34 when an engine 46 of the automobile 22 is turned off and remains off for five consecutive minutes. The at least one infrared sensor 34 is configured to activate an alarm 48 of the automobile 22 when heat is detected in the automobile 22. The central processing unit 40 is configured to activate the wireless transmitter 44 to transmit an emergency signal to an emergency response system, including a 911 system, when the automobile alarm 48 is activated. The at least one infrared sensor 34, the automobile alarm 48, the central processing unit 40, the wireless transmitter 44, the rechargeable battery 42, and the automobile engine 46 are in operational communication with each other.

What is claimed is:

1. An anti-theft and child safety device for an automobile comprising:
    a rearview mirror mounted to an interior of an automobile, the rearview mirror having a mounting support, a mirror support, a reflective mirror mounted within the mirror support, and a front casing continuously disposed around an outer edge of the reflective mirror;
    at least one infrared sensor disposed on the rearview mirror front casing;
    a solar panel disposed on a roof of the automobile;
    a central processing unit disposed within the mirror support of the rearview mirror behind the reflective mirror;
    a wireless transmitter disposed within the mirror support of the rearview mirror; and
    a rechargeable battery disposed within the mirror support of the rearview mirror behind the central processing unit;
    wherein the solar panel is in operational communication with the rechargeable battery, the solar panel configured to selectively charge the rechargeable battery;
    wherein the central processing unit is configured to activate the at least one infrared sensor when an engine of the automobile is turned off and remains off for five consecutive minutes;
    wherein the at least one infrared sensor is configured to activate an alarm of the automobile when heat is detected in the automobile;
    wherein the central processing unit is configured to activate the wireless transmitter to transmit an emergency signal to an emergency response system when the automobile alarm is activated;
    wherein the at least one infrared sensor, the automobile alarm, the central processing unit, the wireless transmitter, the rechargeable battery, and the automobile engine are in operational communication with each other.

2. The anti-theft and child safety device for an automobile of claim 1 wherein the at least one infrared sensor is two.

* * * * *